United States Patent
Lee et al.

(10) Patent No.: US 9,788,002 B2
(45) Date of Patent: Oct. 10, 2017

(54) IMAGE PROCESSING APPARATUS AND METHOD

(71) Applicant: SAMSUNG ELECTRONICS CO., LTD., Suwon-si, Gyeonggi-do (KR)

(72) Inventors: Sang Jo Lee, Suwon-si (KR); Do Hyung Kim, Hawseong-si (KR); Joon Ho Song, Hwaseong-si (KR); Shi Hwa Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 482 days.

(21) Appl. No.: 14/020,019

(22) Filed: Sep. 6, 2013

(65) Prior Publication Data
US 2014/0146873 A1    May 29, 2014

(30) Foreign Application Priority Data

Nov. 29, 2012 (KR) .................. 10-2012-0136928
Feb. 25, 2013 (KR) .................. 10-2013-0019581

(51) Int. Cl.
| H04N 11/02 | (2006.01) |
| H04N 11/04 | (2006.01) |
| H04N 19/423 | (2014.01) |
| H04N 19/119 | (2014.01) |
| H04N 19/174 | (2014.01) |

(52) U.S. Cl.
CPC ......... *H04N 19/423* (2014.11); *H04N 19/119* (2014.11); *H04N 19/174* (2014.11)

(58) Field of Classification Search
None
See application file for complete search history.

(56) References Cited

U.S. PATENT DOCUMENTS

| 2013/0039593 A1* | 2/2013 | Komiya et al. ............... 382/233 |
| 2013/0101035 A1* | 4/2013 | Wang et al. ............ 375/240.12 |
| 2013/0101046 A1* | 4/2013 | Korodi et al. ........... 375/240.18 |
| 2013/0114735 A1* | 5/2013 | Wang ....................... 375/240.23 |
| 2013/0114736 A1* | 5/2013 | Wang et al. ............ 375/240.24 |
| 2013/0202051 A1* | 8/2013 | Zhou ....................... 375/240.26 |
| 2013/0279817 A1* | 10/2013 | Wan et al. .................... 382/233 |
| 2013/0308709 A1* | 11/2013 | Norkin et al. ........... 375/240.25 |

\* cited by examiner

*Primary Examiner* — Andy Rao
*Assistant Examiner* — Samuel D Fereja
(74) *Attorney, Agent, or Firm* — Staas & Halsey LLP (57) ABSTRACT

A method and apparatus for applying a tile size adaptively based on a size of a coding unit. An image processing apparatus may detect a size of a largest coding unit (LCU) used in encoding of a video from a header of a bitstream, may determine a tile size adaptively based on the detected size of the LCU, and may decode the bitstream in units of the LCU based on the determined tile size.

14 Claims, 10 Drawing Sheets

| A | 0 | 1 | 2 | 3 | 0 | 1 | 2 | 3 | B |
|---|---|---|---|---|---|---|---|---|---|
|   | 4 | 5 | 6 | 7 | 4 | 5 | 6 | 7 |   |
|   | 8 | 9 | 10 | 11 | 8 | 9 | 10 | 11 |   |
|   | 12 | 13 | 14 | 15 | 12 | 13 | 14 | 15 |   |
| C | 0 | 1 | 2 | 3 | 0 | 1 | 2 | 3 | D |
|   | 4 | 5 | 6 | 7 | 4 | 5 | 6 | 7 |   |
|   | 8 | 9 | 10 | 11 | 8 | 9 | 10 | 11 |   |
|   | 12 | 13 | 14 | 15 | 12 | 13 | 14 | 15 |   |

IMAGE PROCESSING APPARATUS AND METHOD

CROSS-REFERENCE TO RELATED APPLICATIONS

This application claims the priority benefit of Korean Patent Application No. 10-2012-0136928, filed on Nov. 29, 2012, and Korean Patent Application No. 10-2013-0019581, filed on Feb. 25, 2013, in the Korean Intellectual Property Office, the disclosures of each of which are incorporated herein by reference.

BACKGROUND

1. Field

Example embodiments of the following disclosure relate to a method and apparatus for applying a tile size adaptively, based on a size of a coding unit.

2. Description of the Related Art

Generally, a video decoder reconstructs image data by generating current image data based on previous image data. Accordingly, reading previous image data from a memory and storing reconstructed current image data in a memory may be needed. The reconstructed current image data may be stored in the memory for future use. In general, a dynamic random access memory (DRAM) is used because a size of image data of one frame is large.

SUMMARY

The foregoing and/or other aspects are achieved by providing an image processing apparatus including a detecting unit configured to detect a size of a largest coding unit (LCU) used in encoding of a video from a header of a bitstream, a determining unit configured to determine a tile size adaptively, based on the detected size of the LCU, and a decoding unit configured to decode the bitstream in units of the LCU based on the determined tile size.

The detecting unit may include a parsing unit configured to obtain the size of the LCU by parsing a header field of the bitstream.

The determining unit may include a calculating unit configured to calculate a cycle required to transmit pixels included in the detected LCU to a memory, by tile sizes of a plurality of tiles included in a pool, and a deciding unit configured to decide, to be a tile size for tiling the detected LCU, a tile size corresponding to a smallest cycle required for transmission as a result of the calculation by the calculating unit.

The decoding unit may include a tiling unit configured to tile the pixels included in the LCU to the determined tile size, and an access unit configured to access the memory in tile units used in the tiling.

Frames composing the video may include LCUs of different sizes.

The determining unit may be configured to tile pixels of a pixel block into tiles of a row when the detected LCU has a size of one pixel block among a 16×4 pixel block, a 32×8 pixel block, and a 64×16 pixel block.

The determining unit may be configured to tile pixel blocks representing a plurality of color components included in the detected LCU into tiles of a row.

The image processing apparatus may further include a data reconstructing unit configured to reconstruct, after the decoding of the bitstream, pixel data of the detected LCU through intra prediction using a neighboring pixel of a current frame previously reconstructed, and a control unit configured to store the reconstructed pixel data in the memory, in the determined tile size.

The image processing apparatus may further include a loading unit configured to load, after the decoding of the bitstream, pixel data of a previously stored frame from the memory in units of the determined tile size using decoded motion information, and a data reconstructing unit configured to reconstruct the pixel data of the detected LCU using the loaded previous pixel data and decoded residual data in a current bitstream, and a control unit configured to store the reconstructed pixel data in the memory in the determined tile size.

The foregoing and/or other aspects are achieved by providing an image processing method including detecting a size of an LCU used in encoding of a video from a header of a bitstream, determining a tile size adaptively based on the detected size of the LCU, and decoding the bitstream in units of the LCU based on the determined tile size.

The detecting may include obtaining the size of the LCU by parsing a header field of the bitstream.

The determining may include calculating a cycle required to transmit pixels included in the detected LCU to a memory, by tile sizes of a plurality of tiles included in a pool, and deciding, to be a tile size for tiling the detected LCU, a tile size corresponding to a smallest cycle required for transmission as a result of the calculation.

The decoding may include tiling the pixels included in the LCU to the determined tile size, and accessing the memory in tile units used in the tiling.

The image processing method may further include reconstructing, after the decoding of the bitstream, pixel data of the detected LCU through intra prediction using a neighboring pixel of a current frame previously reconstructed, and storing the reconstructed pixel data in the memory in the determined tile size.

The image processing method may further include loading, after the decoding of the bitstream, pixel data of a previously stored frame from the memory in units of the determined tile size using decoded motion information, reconstructing the pixel data of the detected LCU using the loaded previous pixel data and decoded residual data in a current bitstream, and storing the reconstructed pixel data in the memory in the determined tile size.

The image processing method may include accessing a memory using different tile sizes based on the detected size of the LCU.

An optimized memory access based on the determined tile size may be determined.

A cycle required for transmission may be calculated differently based on an initial latency, a data transmission bus width, and a transmission process.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

To read data from and write data to a dynamic random access memory (DRAM), an initial predetermined period of time allowed for the DRAM to perform an internal operation is required, and after the initial predetermined period of time elapses, reading and writing is possible. This delayed period of time before reading and writing is possible is called an initial latency. For example, to write one byte, an initial latency of N cycles and a write cycle time of 1 cycle, that is, a total of N+1 cycles is required. Here, a value of N may differ based on an operation cycle and characteristics of the DRAM, and may range, for example, from several cycles to several hundred cycles.

With the advancement of technologies, there is a demand for processing of a video composed of high resolution frames. As a successor to H.264/moving picture experts group (MPEG)-4 advanced video coding (AVC), a high efficiency video coding (HEVC) codec is proposed to process a video composed of high resolution frames, and supports resolutions higher than H.264/AVC, MPEG-4. The HEVC codec disallows use of a macro block having a different size from that of MPEG-4 or H.264/AVC, and employs a quad-tree structured coding unit (CU). The coding unit may be split into four sub-quad trees by a split flag. A coding unit of a largest size is termed a largest coding unit (LCU). The coding unit may be classified into a prediction unit (PU) or a unit for an inter prediction or intra prediction, and a transform unit (TU) or a unit for inverse transform.

Figure 1:
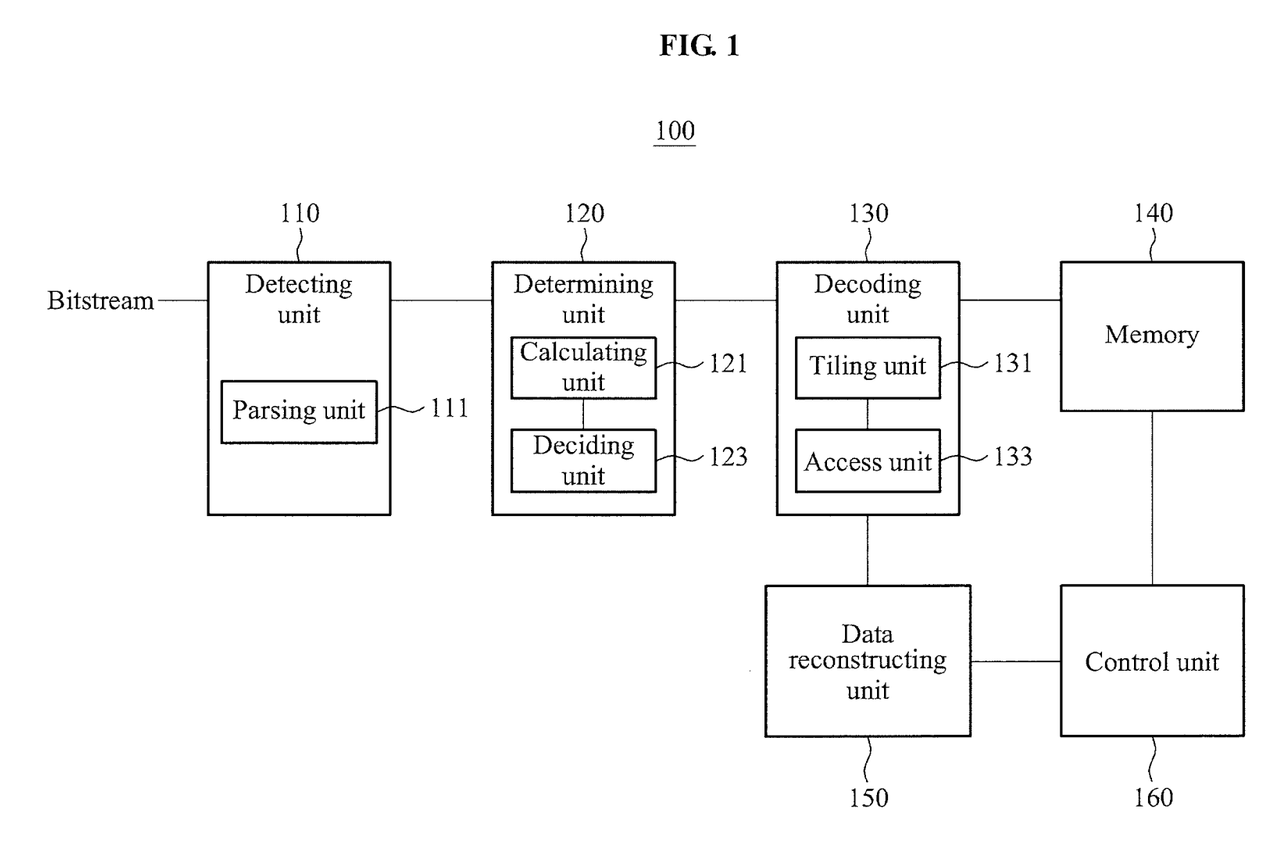
FIG. 1 illustrates an image processing apparatus, according to an example embodiment.

FIG. 1 illustrates an image processing apparatus, according to an example embodiment.

Referring to FIG. 1, the image processing apparatus 100 may include a detecting unit 110, a determining unit 120, a decoding unit 130, a memory 140, a data reconstructing unit 150, and a control unit 160. Any of the above-discussed units may include at least one processing device.

The detecting unit 110 may detect a size of an LCU used in encoding of a video from a header of a bitstream. The detecting unit 110 may parse the header of the bitstream, and may detect the size of the LCU from a result of the parsing.

The detecting unit 110 may include a parsing unit 111. The parsing unit 111 may obtain the size of the LCU by parsing a header field of the bitstream. The parsing unit 111 may perform parsing compliant with a parsing process of an HEVC video decoder.

The determining unit 120 may determine a tile size adaptively based on the size of the LCU detected by the detecting unit 110. The determining unit 120 may determine the tile size differently based on the size of the LCU. Further, the determining unit 120 may select one tile among a plurality of tiles of preset types.

Each frame composing the video may include LCUs of different sizes. Accordingly, the determining unit 120 may determine different tile sizes for each frame based on the size of the LCU.

The determining unit 120 may include a calculating unit 121 and a deciding unit 123.

The calculating unit 121 may calculate a cycle required to transmit pixels included in the LCU detected by the detecting unit 110 to the memory 140, by tile sizes of a plurality of tiles included in a pool. Cycles required for transmission may be calculated differently based on factors, such as, an initial latency cycle, a data transmission bus width, and a transmission process, however, the present disclosure is not limited thereto. For example, the bus width may be 32 bits and the transmission process may be a burst 4-mode transmission process. For example, four bursts may represent data being transmitted over four successive bursts.

The calculating unit 121 may calculate the cycle required for transmitting the pixels included in the LCU by tile sizes, under the conditions of the initial latency cycle, the bus width, and the transmission process being set.

The deciding unit 123 may decide a tile size for tiling the LCU detected by the detecting unit 110 to be a tile size corresponding to a smallest cycle required for transmission based on a result of the calculation performed by the calculating unit 121. The calculating unit 121 may calculate the cycle required for transmission for each tile size. The deciding unit 123 may decide a tile size to be applied to a current LCU to be the tile size corresponding to the smallest cycle required for transmission, thereby optimizing the tile size.

The decoding unit 130 may decode the bitstream in units of the LCU based on the tile size determined by the determining unit 120. The LCU may include a block of pixels. The decoding unit 130 may tile the pixels of the block to the tile size determined by the determining unit 120. A tile determined to be a unit of access to the memory 140 may be used. The decoding unit 130 may decode the bitstream in units of the determined tile.

The decoding unit 130 may include a tiling unit 131 and an access unit 133.

The tiling unit 131 may tile the pixels included in the LCU to the tile size determined by the determining unit 120. The access unit 133 may access the memory 140 in tile units used in tiling. For example, access may be understood as including at least one of writing, reading, deleting, and storing data.

The memory 140 may store data required to reconstruct a pixel.

The data reconstructing unit 150 may reconstruct, after decoding the bitstream, pixel data of the LCU detected by the detecting unit 110 through intra prediction using a neighboring pixel of a current frame previously reconstructed. The data reconstructing unit 150 may reconstruct image data of the pixels included in the LCU through intra prediction.

The control unit 160 may store the pixel data reconstructed by the data reconstructing unit 150 in the memory 140, in the tile size determined by the determining unit 120. The control unit 160 may allow a rapid access to the memory 140 using various tile sizes based on the size of the LCU.

For example, operations of the detecting unit 110, the determining unit 120, the decoding unit 130, the memory 140, the data reconstructing unit 150, and the control unit 160 may be performed by a processor of a hardware device, for example, a computer or a terminal.

The control unit 160 may control general operations of the image processing apparatus 100, and may perform functions of the detecting unit 110, the determining unit 120, the decoding unit 130, and the data reconstructing unit 150. Although the example of FIG. 1 shows the detecting unit 110, the determining unit 120, the decoding unit 130, and the data reconstructing unit 150 as separate components so as to distinguish each function, in another example embodiment, a product may actually be implemented to allow the control unit 160 to perform some or all of the functions of the detecting unit 110, the determining unit 120, the decoding unit 130, and the data reconstructing unit 150.

Figure 2:
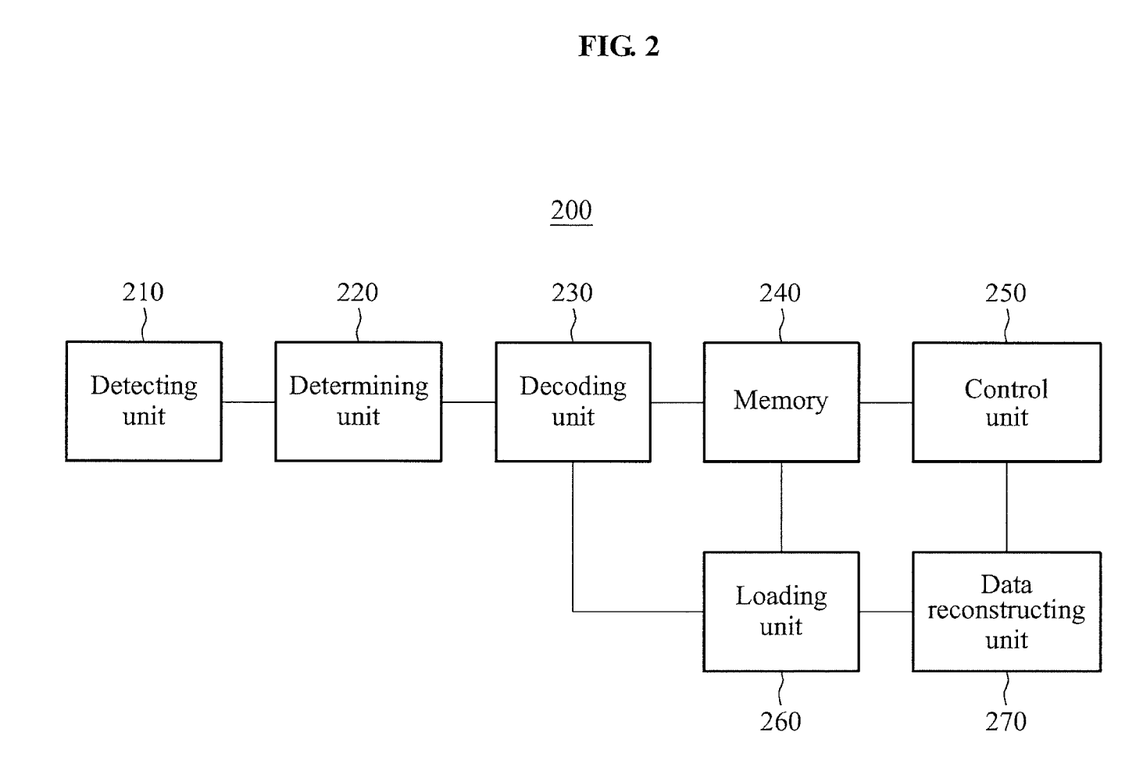
FIG. 2 illustrates an image processing apparatus, according to another example embodiment.

FIG. 2 illustrates an image processing apparatus, according to another example embodiment.

Referring to FIG. 2, the image processing apparatus 200 may include a detecting unit 210, a determining unit 220, a decoding unit 230, a memory 240, a control unit 250, a loading unit 260, and a data reconstructing unit 270. Any of the above-described units may include at least one processing device.

The detecting unit 210 may detect a size of an LCU used in encoding of a video from a header of a bitstream. The detecting unit 210 may parse the header of the bitstream, and may detect the size of the LCU from a result of the parsing.

The determining unit 220 may determine a tile size adaptively based on the size of the LCU detected by the detecting unit 210. The determining unit 220 may determine the tile size differently based on the size of the LCU. The determining unit 220 may select one tile among a plurality of tiles of preset types.

Each frame composing the video may include LCUs of different sizes. Accordingly, the determining unit 220 may determine different tile sizes for each frame based on the size of the LCU.

The determining unit 220 may calculate a cycle required to transmit pixels included in the LCU detected by the detecting unit 210 to the memory 240, by tile sizes of a plurality of tiles included in a pool. The cycle required for transmission may be calculated differently based on an initial latency cycle, a data transmission bus width, and a transmission process. For example, the bus width may be 32 bits and the transmission process may be a burst 4-mode transmission process, however, the present disclosure is not limited thereto. Here, four bursts may represent data being transmitted over four successive bursts. When each pixel has 8 bits, four pixels may be transmitted at a time via the 32-bit bus. The initial latency cycle may be spent line by line each time an access is made, and the fewer the number of lines, the smaller total initial latency value.

The determining unit 220 may calculate a cycle required to transmit the pixels included in the LCU by tile sizes, under the conditions of the initial latency cycle, the bus width, and the transmission process being set.

The determining unit 220 may determine a tile size for tiling the LCU detected by the detecting unit 210 to be a tile size corresponding to a smallest cycle required for transmission. The determining unit 220 may calculate the cycle required for transmission for each tile size. The determining unit 220 may determine a tile size to be applied to a current LCU to be the tile size corresponding to the smallest cycle required for transmission.

When the LCU has one size among a 16×4 pixel block, a 32×8 pixel block, and a 64×16 pixel block, the determining unit 220 may tile pixels of the pixel block into tiles of a row. That is, the tiles may have one row. Accordingly, a 16×4 pixel block may be tiled into 64×1 tiles, a 32×8 pixel block may be tiled into 256×1 tiles, and a 64×16 pixel block may be tiled into 1024×1 tiles.

The determining unit 220 may tile pixel blocks representing a plurality of color components included in the LCU into tiles of a row. For example, when a red component is included in a 16×4 pixel block, a green component is included in a 16×4 pixel block, and a blue component is included in a 16×4 pixel block, the determining unit 220 may tile the pixel blocks into a 192×1 tile to include all the pixel blocks.

The decoding unit 230 may decode the bitstream in units of the LCU based on the tile size determined by the determining unit 220. The LCU may include a block of pixels. The decoding unit 230 may tile the pixels of the block to the tile size determined by the determining unit 220. A tile determined to be a unit of access to the memory 240 may be used. The decoding unit 230 may decode the bitstream in units of the determined tile.

The memory 240 may store data required to reconstruct a pixel.

The loading unit 260 may load, after decoding the bitstream, pixel data of a previously stored frame from the memory 240 in units of the tile size determined by the determining unit 220, using decoded motion information. For example, the motion information may include a motion vector used in inter prediction. The loading unit 260 may also access rapidly to the memory 240 using various tile sizes based on the size of the LCU.

The data reconstructing unit 270 may reconstruct the pixel data of the LCU detected by the detecting unit 210 using previous pixel data loaded by the loading unit 260 and decoded residual data in a current bitstream.

The control unit 250 may store the pixel data reconstructed by the data reconstructing unit 270 in the memory 240, in the tile size determined by the determining unit 220. The control unit 250 may access rapidly to the memory 240 using various tile sizes based on the size of the LCU.

Figure 3:
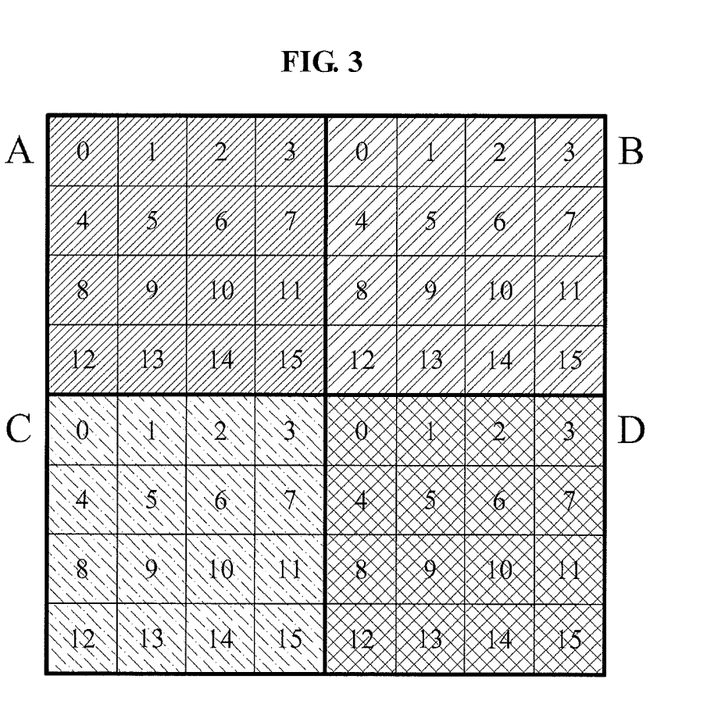
FIG. 3 illustrates a block used in an image processing apparatus, according to an example embodiment.

FIG. 3 illustrates a block used in an image processing apparatus, according to an example embodiment.

Referring to FIG. 3, an LCU may be configured to a block. A block may include pixels. Here, a pixel may have, for example, 8 bits. Blocks A, B, C, and D may have a size of 4×4 pixels, and each may correspond to an LCU.

Figure 4:
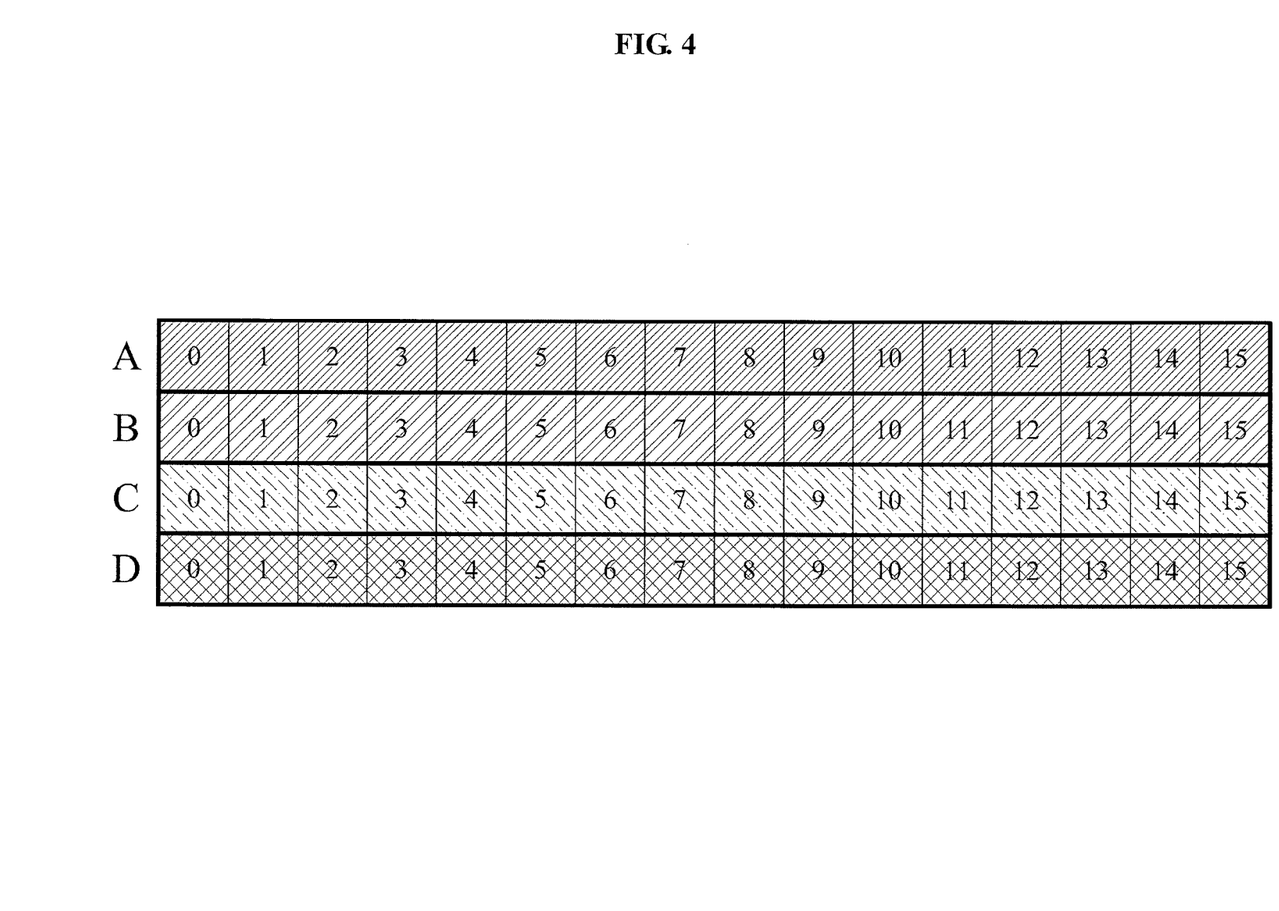
FIG. 4 illustrates a tile used in an image processing apparatus, according to an example embodiment.

FIG. 4 illustrates a tile used in an image processing apparatus, according to an example embodiment.

When the blocks A, B, C, and D of FIG. 3 are given as an example, the blocks A, B, C, and D, each having a size of 4×4 pixels, may be tiled into 16×1 tiles.

Due to a 4×4 pixel structure, in a case of block-based access (as in FIG. 3), four horizontal accesses may be required. In a case of tile-based access (as in FIG. 4), one horizontal access may be required.

For example, when an initial latency is 20 cycles, a bus width is 32 bits, and a transmission process is a burst 4-mode transmission process, tile-based access may have an effect of transmitting four pixels in a horizontal direction at a time via the 32-bit bus in a case in which each pixel has 8 bits.

In a case of block-based access, for example, using the block of FIG. 3, a cycle required for transmission may be $(20_{latency}+1_{4\ pixel\ transmission\ cycles})\times 4_{line}=84$ cycles. In this case, because four horizontal accesses are needed, four initial latency cycles may be required.

However, in a case of tile-based access, for example, using the tile of FIG. 4, a cycle required for transmission may be $(20_{latency}+1_{4\ pixel\ transmission\ cycles} \times 4\ times)=24$ cycles. In this case, because one horizontal access is needed, four successive transmissions may be made each of the four pixels at a time. Accordingly, tile-based access (as in FIG. 4) may be found to be about four times faster than block-based access.

Figure 5:
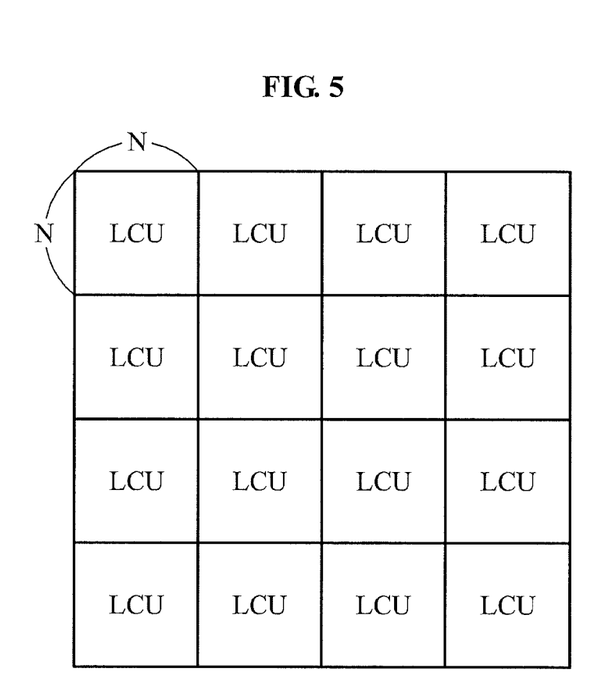
FIGS. 5 and 6 illustrate examples of frames made up of large coding units (LCUs) of different sizes used in an image processing apparatus, according to an example embodiment.
Figure 6:
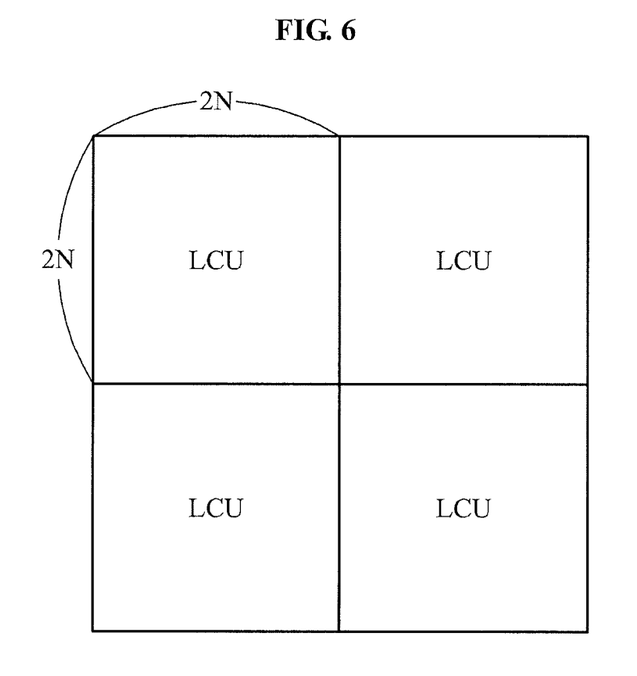

FIGS. 5 and 6 illustrate examples of frames made up of LCUs of different sizes used in an image processing apparatus, according to an example embodiment.

Referring to FIGS. 5 and 6, a size of an LCU may differ for each bitstream. In the example of FIG. 5, a frame may include LCUs, each LCU composed of N×N pixels. In the example of FIG. 6, a frame may include LCUs, each LCU composed of 2N×2N pixels. In a case in which LCUs have different sizes, different tile sizes may be applied. The size of LCUs as shown in FIGS. 5-6 are examples, and thus, the present disclosure is not limited thereto.

Figure 7:
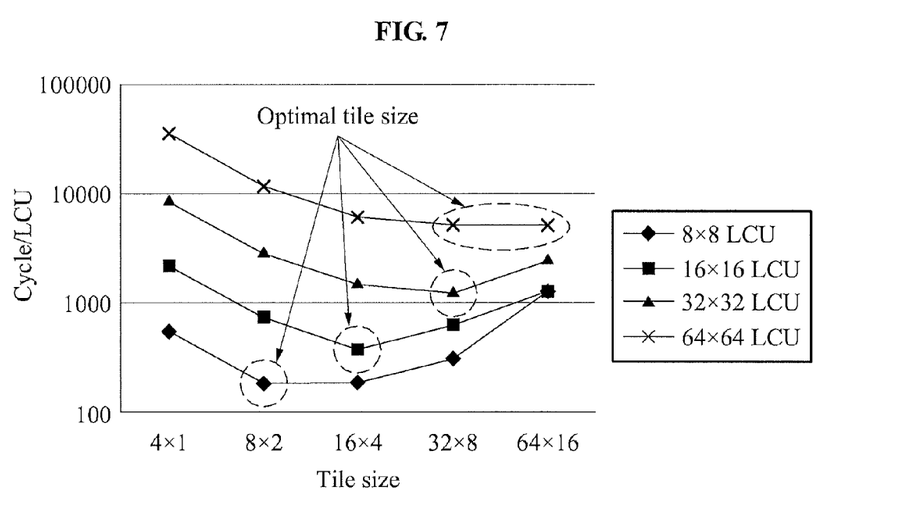
FIG. 7 is a graph illustrating an effect of applying different tile sizes based on a size of an LCU in an image processing apparatus, according to an example embodiment.

FIG. 7 is a graph illustrating an effect of applying different tile sizes based on a size of an LCU in an image processing apparatus, according to an example embodiment.

Referring to FIG. 7, in a case in which LCUs of 8×8, 16×16, 32×32, and 64×64 pixels are used, an optimal tile size for data access may be selected from 4×1, 8×2, 16×4, 32×8, and 64×16 tiles.

For LCUs of each size, cycles may be calculated for each tile size. When a bus width is 64 bits and a burst 16-mode transmission scheme is used, an 8×8 LCU may have a smallest cycle required with an 8×2 tile size, and a 32×32 LCU may have a smallest cycle required with a 32×8 tile size. Accordingly, in a case of an 8×8 LCU, an 8×2 tile size may be determined to be an optimal tile size, and in a case of a 32×32 LCU, a 32×8 tile size may be determined to be an optimal tile size.

As can be seen from FIG. 7, an optimal tile size for each LCU size is indicated by dashed lines.

A cycle required for memory access may be minimized by applying an optimal tile size differently based on a size of an LCU in use.

Figure 8:
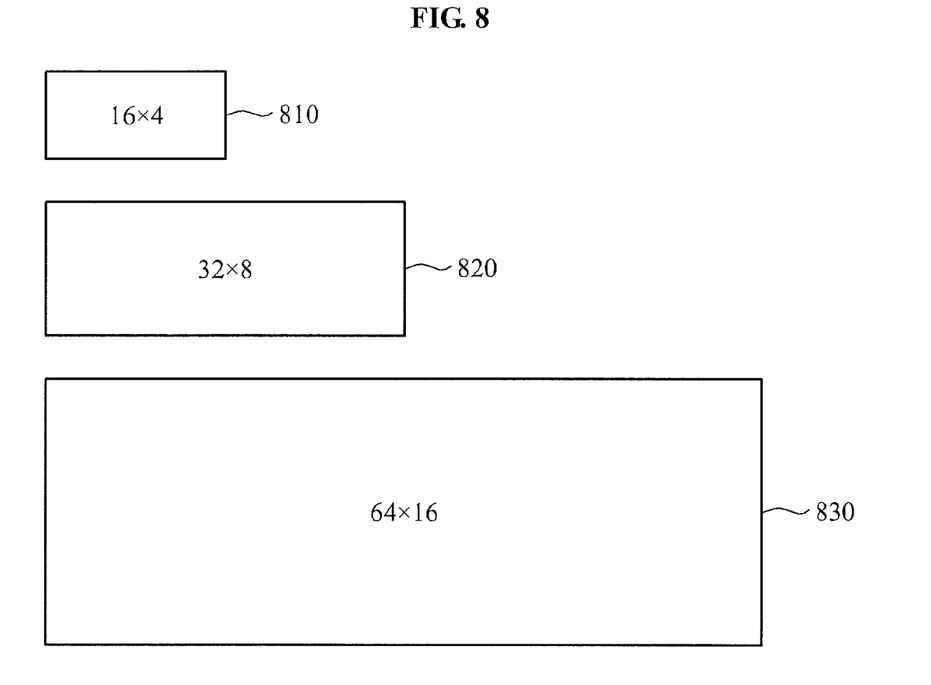
FIGS. 8 and 9 illustrate examples of types of tiles used in an image processing apparatus, according to an example embodiment.
Figure 9:
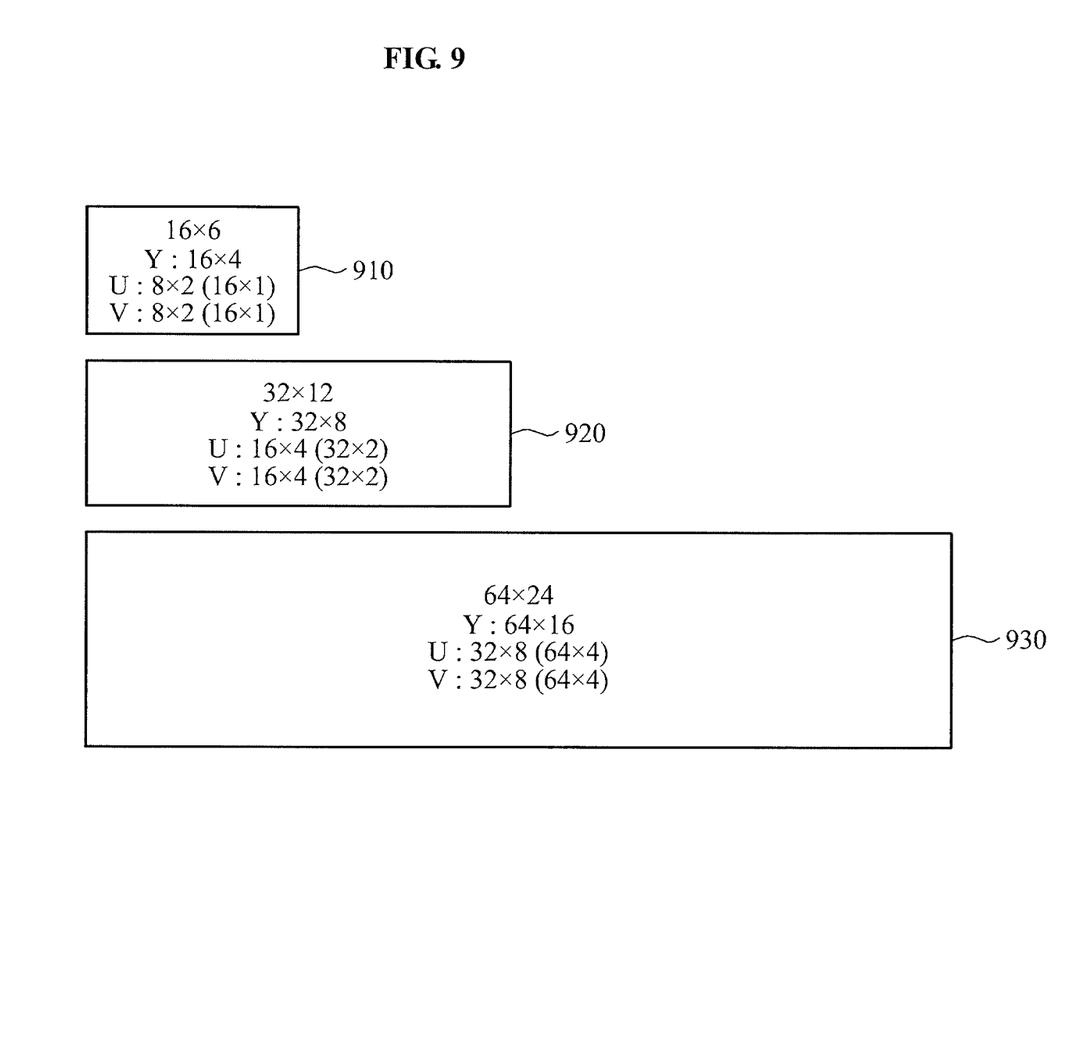

FIGS. 8 and 9 illustrate examples of types of tiles used in an image processing apparatus according to an example embodiment.

Referring to FIG. 8, a tile 810 is an example of a pixel block of one row including 16×4 pixels, a tile 820 is an example of a pixel block of one row including 32×8 pixels, and a tile 830 is an example of a pixel block of one row including 64×16 pixels.

Referring to FIG. 9, one tile may be composed of a plurality of color components. In a case of YUV color components being used, a tile 910 is an example of a tile of one row including a Y block of 16×4 pixels, a U block of 8×2 pixels, and a V block of 8×2 pixels. The U block may include 16×1 pixels. The V block may include 16×1 pixels.

A tile 920 is an example of a tile of one row including a Y block of 32×8 pixels, a U block of 16×4 pixels, and a V block of 16×4 pixels. The U block may include 32×2 pixels. The V block may include 32×2 pixels.

A tile 930 is an example of a tile of one row including a Y block of 64×16 pixels, a U block of 32×8 pixels, and a V block of 32×8 pixels. The U block may include 64×4 pixels. The V block may include 64×4 pixels.

Each tile may include contiguous pixels. The tile 910 having a 16×6 pixel structure may include 96 contiguous pixels in which the Y block of 16×4 pixels, the U block of 8×2 pixels, and the V block of 8×2 pixels are connected.

FIG. 9 illustrates the example case of using YUV color components, however, the present disclosure is not limited to the YUV color components. That is, other color components may be used.

Figure 10:
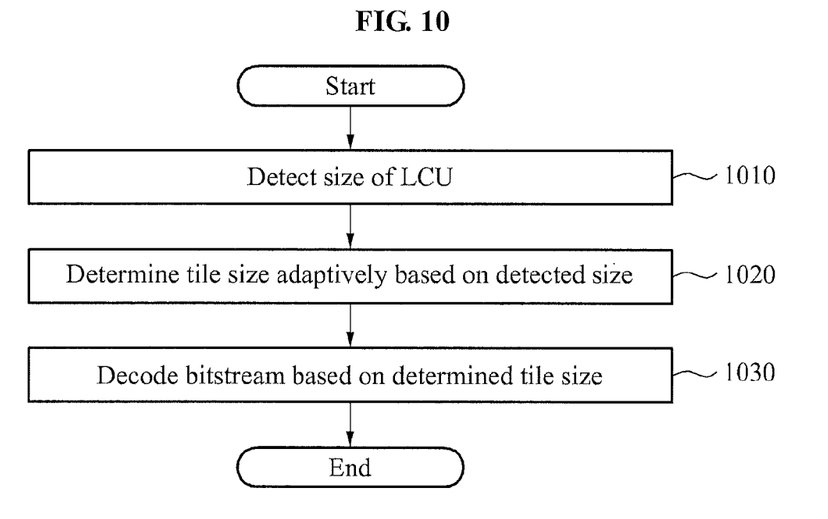
FIG. 10 is a flowchart illustrating an image processing method, according to an example embodiment.

FIG. 10 is a flowchart illustrating an image processing method according to an example embodiment.

Referring to FIG. 10, in operation 1010, the image processing apparatus according to an example embodiment may detect a size of an LCU used in encoding of a video from a header of a bitstream. The image processing apparatus may obtain the size of the LCU by parsing a header field of the bitstream.

In operation 1020, the image processing apparatus may determine a tile size adaptively based on the detected size of the LCU.

The image processing apparatus may calculate a cycle required to transmit pixels included in the detected LCU to a memory, by tile sizes of a plurality of tiles included in a pool.

The image processing apparatus may determine a tile size for tiling the detected LCU to be a tile size corresponding to a smallest cycle required for transmission as a result of the calculation.

In operation 1030, the image processing apparatus may decode the bitstream in units of the LCU based on the determined tile size.

The image processing apparatus may tile the pixels included in the LCU to the determined tile size and may access the memory in tile units used in the tiling.

The image processing apparatus may reconstruct, after decoding the bitstream, pixel data of the detected LCU through intra prediction using a neighboring pixel of a current frame previously reconstructed, and may store the reconstructed pixel data in the memory in the determined tile size.

Depending on embodiments, the image processing apparatus may load, after decoding the bitstream, pixel data of a previously stored frame from the memory in units of the determined tile size using decoded motion information, may reconstruct the pixel data of the detected LCU using loaded previous pixel data and decoded residual data in a current bitstream, and may store the reconstructed pixel data in the memory in the determined tile size.

According to example embodiments, the image processing apparatus may allow a rapid access to a memory by applying different tile sizes adaptively based on a size of an LCU composing a frame.

According to example embodiments, the image processing apparatus may allow, in the ultra high definition (UHD) image or video processing using a state-of-the-art video decoder, optimized memory access for the video decoder and reduced minimum operation cycle to improve a degree of freedom of system design and to reduce the power consumption.

The methods according to the above-described embodiments may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

Further, according to an aspect of the embodiments, any combinations of the described features, functions and/or operations can be provided.

Moreover, the image processing apparatus discussed above may include at least one processor to execute at least one of the above-described units and methods.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image processing apparatus for processing frames of a video, the apparatus comprising:
    a detecting unit configured to detect a size of a largest coding unit (LCU) used in encoding a bitstream;
    a determining unit configured to determine a tile size adaptively based on the detected size of the LCU; and
    a decoding unit configured to decode the bitstream,
    wherein the determining unit further comprises:
        a calculating unit configured to calculate a cycle required to transmit pixels included in the LCU to a memory, by tile sizes of a plurality of tiles included in a pool; and
        a deciding unit configured to decide, as the tile size for tiling the LCU, the tile size corresponding to a smallest cycle required for transmission as a result of the calculation by the calculating unit,
    wherein the determining unit is configured to tile pixels of a pixel block into tiles of a row when the detected size of the LCU is a size of one pixel block among a 16×4 pixel block, a 32×8 pixel block, and a 64×16 pixel block, and
    wherein frames composing the video include LCUs of different sizes and the determining unit determines a respective tile size for each frame based on the size of the LCU.

2. The image processing apparatus of claim 1, wherein the detecting unit comprises:
    a parsing unit configured to obtain the size of the LCU by parsing a header field of the bitstream.

3. The image processing apparatus of claim 1, wherein the decoding unit further comprises:
    a tiling unit configured to tile the pixels included in the LCU by the determined tile size; and
    an access unit configured to access the memory by the determined tile size.

4. The image processing apparatus of claim 1, wherein the determining unit is configured to tile pixel blocks representing a plurality of color components included in the LCU into the tiles of the row.

5. The image processing apparatus of claim 1, further comprising:
    a data reconstructing unit configured to reconstruct, after the decoding of the bitstream, pixel data of the LCU through intra prediction using a neighboring pixel of a current frame previously reconstructed; and
    a control unit configured to store the reconstructed pixel data in the memory in the determined tile size.

6. The image processing apparatus of claim 1, further comprising:
    a loading unit configured to load, after the decoding of the bitstream, pixel data of a previously stored frame from the memory in units of the determined tile size using decoded motion information;
    a data reconstructing unit configured to reconstruct pixel data of the LCU using the loaded previous pixel data and decoded residual data in a current bitstream; and
    a control unit configured to store the reconstructed pixel data in the memory in the determined tile size.

7. The image processing apparatus of claim 1, wherein a cycle required for transmission is calculated differently based on an initial latency, a data transmission bus width, and a transmission process.

8. An image processing method for processing frames of a video, the method comprising:
    detecting a size of a largest coding unit (LCU) used in encoding of a video of a bitstream;
    determining a tile size adaptively based on the detected size of the LCU; and
    decoding the bitstream,
    wherein the determining further comprises:
        calculating a cycle required to transmit pixels included in the LCU to a memory, by tile sizes of a plurality of tiles included in a pool; and
        deciding, as the tile size for tiling the LCU, the tile size corresponding to a smallest cycle required for transmission as a result of the calculation, and
    wherein the determining tiles pixels of a pixel block into tiles of a row when the detected LCU has a size of one pixel block among a 16×4 pixel block, a 32×8 pixel block, and a 64×16 pixel block, and
    wherein frames composing the video include LCUs of different sizes, and wherein the determining determines a respective tile size for each frame based on the detected size of the LCU.

9. The image processing method of claim 8, wherein the detecting comprises:
    obtaining the size of the LCU by parsing a header field of the bitstream.

10. The image processing method of claim 8, wherein the decoding further comprises:
    tiling the pixels included in the LCU by the determined tile size; and
    accessing the memory by the determined tile size.

11. The image processing method of claim 8, further comprising:

reconstructing, after the decoding of the bitstream, pixel data of the LCU through intra prediction using a neighboring pixel of a current frame previously reconstructed; and storing the reconstructed pixel data in the memory in the determined tile size.

12. The image processing method of claim 8, further comprising:

loading, after the decoding of the bitstream, pixel data of a previously stored frame from the memory in units of the determined tile size using decoded motion information;

reconstructing pixel data of the LCU using the loaded previous pixel data and decoded residual data in a current bitstream; and storing the reconstructed pixel data in the memory in the determined tile size.

13. The image processing method of claim 8, further comprising accessing the memory using different tile sizes based on the detected size of the LCU.

14. The image processing method of claim 8, wherein the determining comprises determine an optimized memory access based on the decided tile size.

* * * * *